(12) United States Patent
Sonderegger et al.

(10) Patent No.: US 7,115,821 B1
(45) Date of Patent: Oct. 3, 2006

(54) LASER MODULE CARRIER FOR PRINTED CIRCUIT BOARDS

(75) Inventors: Mark Sonderegger, Kanata (CA); Balwantrai Mistry, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 372 days.

(21) Appl. No.: 10/681,871

(22) Filed: Oct. 8, 2003

(51) Int. Cl.
*H01R 13/46* (2006.01)
*H05K 5/00* (2006.01)

(52) U.S. Cl. ................................ 174/520; 361/809
(58) Field of Classification Search ................ 361/809, 361/752; 174/52.1, 520
See application file for complete search history.

(56) References Cited

U.S. PATENT DOCUMENTS

| | | | | |
|---|---|---|---|---|
| 4,858,067 A | * | 8/1989 | Rochelle et al. | ............ 361/600 |
| 5,805,423 A | * | 9/1998 | Wever et al. | ............... 361/760 |
| 6,184,462 B1 | * | 2/2001 | Bellur et al. | ............... 174/52.1 |
| 6,275,388 B1 | * | 8/2001 | Hennick et al. | ............ 361/807 |

* cited by examiner

*Primary Examiner*—Hung V. Ngo
(74) *Attorney, Agent, or Firm*—Guerin&Rodriguez,LLP; William G. Guerin

(57) ABSTRACT

A carrier for alignment and attachment of an electronics module to a circuit board is described. The carrier includes a frame having sides defining a region to receive the electronics module. A gap between two of the sides allows for passage of leads that extend from the electronics module. The frame includes an alignment guide to align the electronics module to the carrier, an alignment guide to align the frame to the circuit board and a capture device to attach the electronics module to the frame. The carrier also includes a fiber guide or wire guide extending from one of the sides of the frame to secure an optical fiber or wire, respectively, extending from the electronics module. At least one of the sides of the frame has an opening to receive a fastener for attaching the carrier to the circuit board.

6 Claims, 5 Drawing Sheets

LASER MODULE CARRIER FOR PRINTED CIRCUIT BOARDS

FIELD OF THE INVENTION

The invention relates generally to the mounting of electronic components to circuit boards. In particular, the invention relates to a carrier apparatus for mounting a laser module to a printed circuit board.

BACKGROUND

Dense wavelength division multiplexing (DWDM) systems includes lasers which require precise and accurate temperature control for satisfactory performance. Each laser is typically integrated in a package or laser module which is mounted to a printed circuit board (PCB). Previously, heat sinks were mounted directly to the laser modules to remove excess heat. The long flexible wire leads extending from the laser module were sufficient to accommodate the dimensional tolerances of mounting holes used to mount the laser module to the heat sink, of mounting holes in the PCB for mounting the heat sink to the PCB, and of the solder pads or holes for connection of the laser module leads to the PCB.

As communication data rates increase, the positions of the leads extending from the laser module cannot be disturbed without adversely affecting the electrical characteristics of the laser module and PCB. For example, bending or flexing the leads during the process of mounting the laser module to the PCB can cause signal loss. In addition, the leads cannot be misaligned to the tracks on the PCB without degrading the electrical signals. Moreover, a heat sink mounted directly to the laser module can generate stress sufficient to break the leads.

Accordingly, there exists a need for a laser carrier that can accurately align and secure a laser module to a PCB. Moreover, the laser carrier should prevent substantial stress on the leads extending from the laser module. The present invention satisfies this need and provides additional advantages.

SUMMARY OF THE INVENTION

In one aspect, the invention features a carrier for alignment and attachment of an electronics module having a plurality of leads to a circuit board. The carrier includes a frame and an alignment guide disposed on the frame to align the electronics module to the carrier. The frame includes a plurality of sides defining a region to receive the electronics module. The frame has a gap between two of the sides for passage of the leads from the electronics module. At least one of the sides has a first surface configured to maintain contact with a surface of the electronics module when the electronics module is secured to the frame. At least one of the sides has a second surface configured to maintain contact with a first surface of the circuit board when the carrier is secured to the circuit board. The first and second surfaces of the sides are separated by a predetermined distance to position the leads substantially along a second surface of the circuit board. In one embodiment the carrier also includes an alignment guide disposed on the frame to align the frame to the circuit board. In another embodiment the carrier also includes a capture device disposed on one of the sides of the frame to secure the electronics module to the frame. In yet other embodiments the carrier also includes a fiber guide or a wire guide extending from one of the sides opposite the region to receive the electronics module.

In another aspect, the invention features a carrier for attachment of a laser module having a plurality of leads to a circuit board. The carrier includes a frame having a first side, a second side and a third side in a C-shaped configuration. At least one of the sides has a first surface, at least one of the sides has a second surface and at least one of the sides has an opening to receive a board fastener. The first and second surfaces are separated by a predetermined distance so that the leads of the laser module are positioned substantially along a surface of the circuit board when the laser module is secured to the carrier and the carrier is secured to the circuit board. The carrier also includes a first plurality of alignment posts disposed on the first surfaces and a second plurality of alignment posts disposed on the second surfaces. The carrier also includes a capture clip disposed on one of the sides to secure the laser module to the frame and a fiber guide extending from one of the sides.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

In brief overview, the present invention relates to a carrier for accurately positioning and securing an electronics module to a circuit board. In general, the carrier includes a frame having sides that surround a capture region. The sides include holes to pass mounting screws used to secure the carrier to the circuit board. Alignment posts extending from the upper surface of the sides of the frame engage holes in the electronics component packaging to accurately position the electronics component within the plane of the capture region. Alignment posts extending from the upper surface of one or more sides of the frame engage holes in the circuit board to ensure accurate positioning of the carrier to the circuit board. One of the sides also includes a capture device to eliminate movement of the electronics module in a direction normal to the plane of the capture region.

Figure 1:
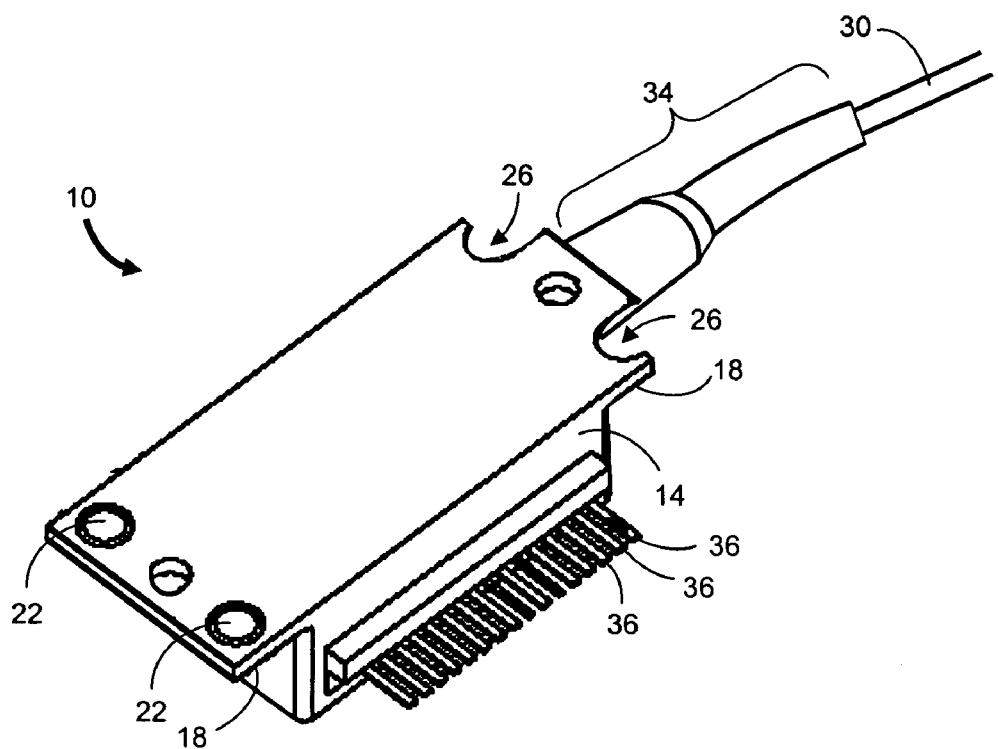
FIG. 1 is an illustration of a laser diode module used in DWDM communication systems.

FIG. 1 depicts a laser module 10 used for dense wavelength division multiplexing (DWDM) communications. The laser module 10 includes a laser, a thermoelectric cooler and other electrical and/or optical internal components. Flanged portions 18 extend from opposite ends of the laser module 10. The flanged portions 18 include holes 22 and notches 26 used for mounting the laser module 10 to a circuit board such as a printed circuit board (PCB). Optical signals generated by the internal laser are transmitted through an optical fiber 30 extending from the laser module 10. A fiber boot 34 extending through one end of the laser module 10 substantially eliminates stress on the optical fiber 30 that might otherwise be induced at the region where the optical fiber 30 contacts the laser module 10.

Electrical leads 36, or pins, extend out from a side 14 of the laser module 10. These leads 36 apply various voltages and/or supply current to the internal components of the laser module 10. For example, the voltages can be used to electrically bias the laser and to power the thermoelectric cooler. In addition one or more leads 36 can be used to provide data signals to the laser. The leads 36 are generally fragile and can be fractured if excessive stress is applied. Moreover, if the leads 36 are disturbed from their nominal position, their electrical characteristics can change, leading to degradation in the performance of the laser module 10, especially at high data rates.

Figure 2:
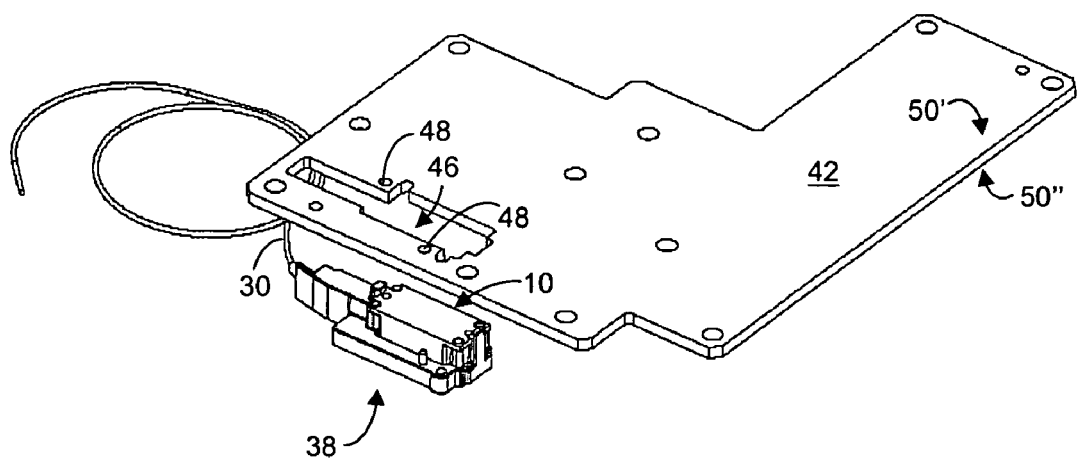
FIG. 2 is an illustration of an embodiment of a carrier for attaching a laser module to a circuit board in accordance with the principles of the invention.

FIG. 2 illustrates the laser module 10 secured to a carrier 38 in accordance with the principles of the invention. The carrier 38 is shown below a PCB 42 prior to mounting. An opening 46 in the PCB 42 is shaped to accept the laser module 10 and carrier 38, and to allow the leads (not visible) of the laser module 10 to extend over a surface 50' or 50" (generally 50) of the PCB 42. As described in more detail below, alignment holes 48 in the PCB 42 are used to achieve accurate lateral positioning of the laser module 10 in the plane of the PCB 42. Once the carrier 38 is secured to the PCB 42, the leads can be soldered to conductive pads or conductive regions on one of the PCB surfaces 50.

Figure 3A:
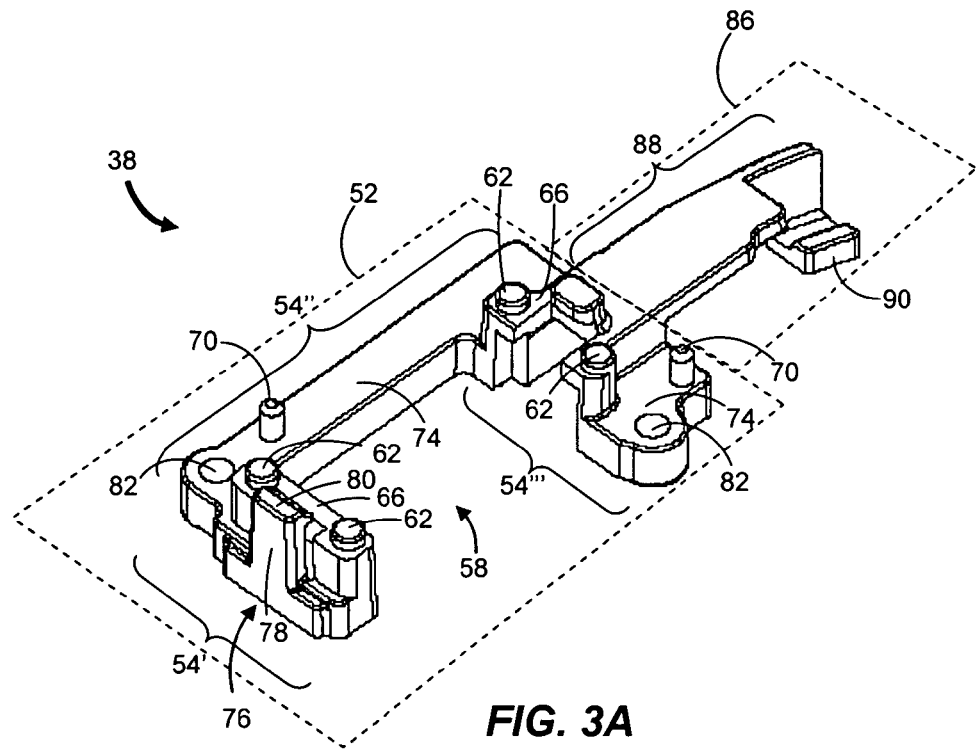
FIG. 3A and FIG. 3B are top and bottom views, respectively, of an embodiment of a carrier for attaching a laser module to a circuit board in accordance with the principles of the invention.
Figure 3B:
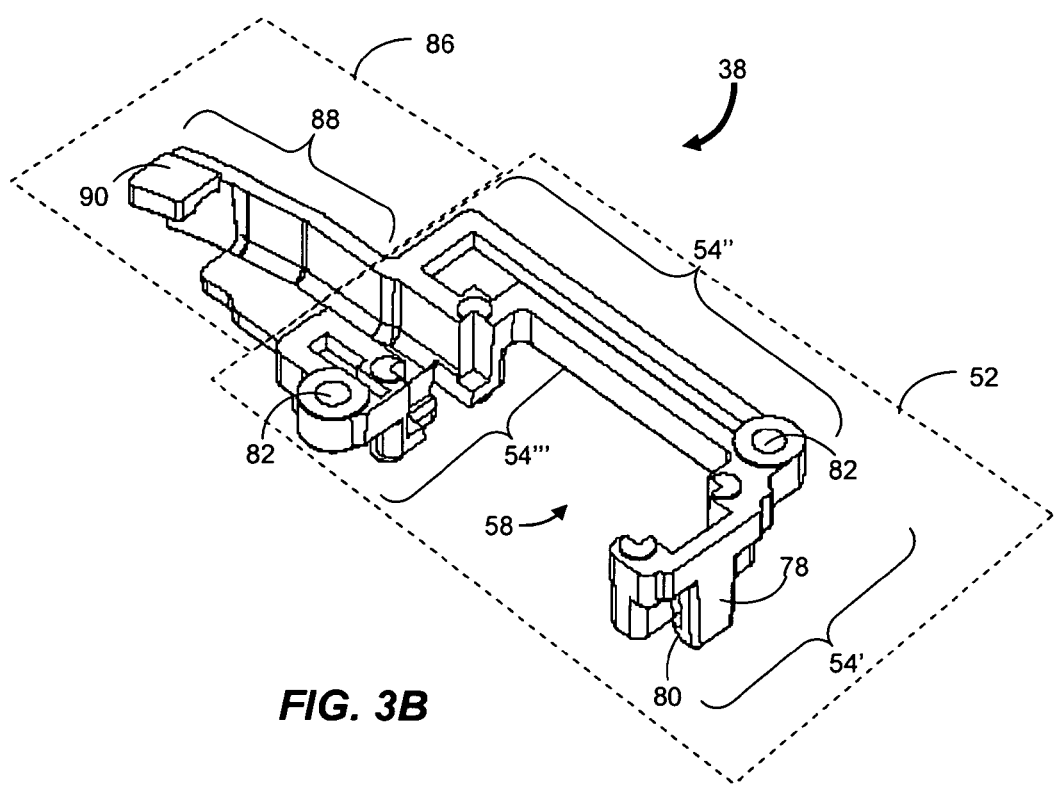

FIG. 3A and FIG. 3B illustrate top and bottom views, respectively, of a carrier 38 constructed according to the principles of the invention. The carrier 38 includes a frame 52 having three sides 54', 54" and 54'" (generally 54) arranged in the shape of the letter "C". The frame 52 can be fabricated from flame retardant polycarbonate plastic. The sides 54 substantially surround a region 58 that receives the laser module. An open portion, or gap, in the frame 52 (between ends of opposing sides 54' and 54'") prevents interference between the frame 52 and the module leads. The opposing sides 54', 54'" include four module alignment posts 62 that extend normal to upper surfaces 66 of the sides 54', 54'". These module alignment posts 62 act as an alignment guide and allow for accurate lateral positioning of the laser module in the carrier 38. Two of the sides 54", 54'" have board alignment posts 70 extending normal to their respective lower surfaces 74. The board alignment posts 70 serve as an alignment guide and ensure accurate positioning of the carrier 38 to the PCB 42. In other embodiments the module alignment posts 62 and/or the board alignment posts 70 are located on just one side 54 of the frame or all three sides 54 of the frame.

The upper and lower surfaces 66 and 74, respectively, are fabricated according to strict dimensional tolerances of few thousands of an inch such that the vertical separation of the surfaces 66, 74 provides accurate vertical positioning (i.e., along an axis normal to the PCB surfaces) within the opening 46 in the PCB 42 when the carrier 38 is mounted. As a result, the leads 36 extending from the laser module 10 lie along or just above a surface 50 of the PCB 42. Thus the leads 36 can be soldered or otherwise electrically coupled to the PCB 42 without bending or flexing.

The frame 52 includes a capture device 76 on one side 54' for securing the laser module to the carrier 38. As illustrated, the capture device 76 is a clip having a resilient stem 78 extending normal to the plane of the frame 52. The stem 78 terminates at a tab 80 that extends laterally towards the region 58 in the frame 52. The sides 54 of the frame 52 include holes 82 to receive board fasteners for securing the carrier 38 to the PCB 42. The board fasteners can be, for example, screws which pass through openings in the PCB 42 and holes 82 in the frame 52. The screws form threads in the holes 82 when they are first inserted.

The carrier 38 includes a fiber guide 86 that extends normal to one side 54'" away from the region 58. The fiber guide 86 provides a means to safely secure the optical fiber 30 where the optical fiber 30 extends from the laser module 10 without inducing undesirable stress. The fiber guide 86 includes an elongated portion 88 having a channel to pass and substantially encompass the boot 34 of the optical fiber 30. A fiber clip 90 at the end of the elongated portion 88 opposite the frame 52 is used to grip a portion of the fiber boot 34.

In other embodiments of the carrier 38 that are used to secure an electronics module having electrical wires or cables extending from the module, a wire guide extends from the frame 52 in place of the fiber guide 86. The wire guide is similar in construction and function to the fiber guide 86 in that the wire guide secures one or more wires, or cables, that extend from the electronics module and pass through a boot.

Figure 4C:
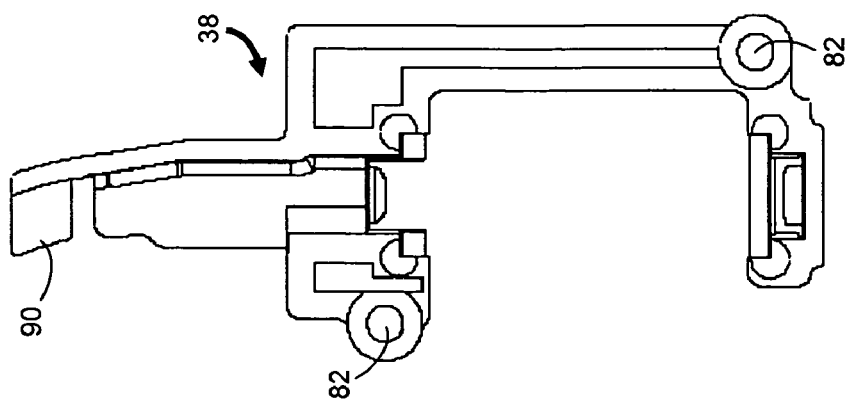
FIG. 4A, FIG. 4B and FIG. 4C are top, side and bottom views, respectively, of the carrier of FIG. 3A and FIG. 3B showing exemplary dimensions.
Figure 4B:
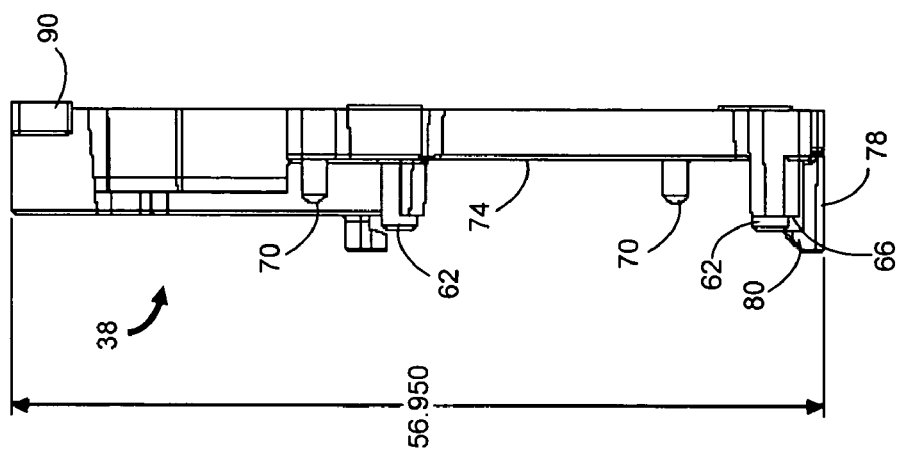
Figure 4A:
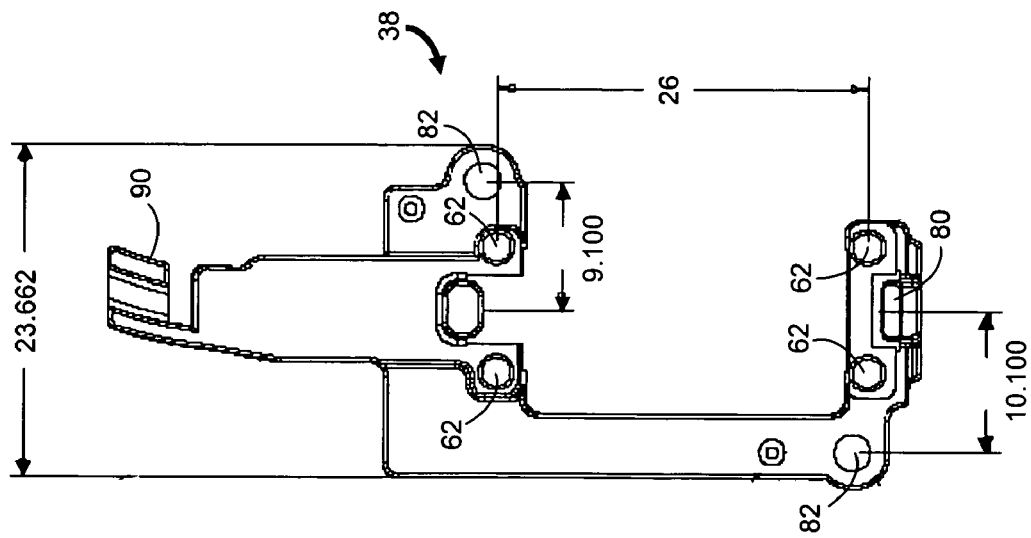

FIG. 4A, FIG. 4B and FIG. 4C illustrate a top, a side and a bottom view, respectively, of the carrier 38 of FIG. 3A and FIG. 3B with exemplary dimensions shown in millimeters. It should be recognized that the indicated dimensions refer to a certain laser module and PCB configuration. One of skill in the art will recognize that the dimensions of the carrier 38 can be varied according to the dimensions and features of the specific laser module (or electronics module) and circuit board.

Figure 5:
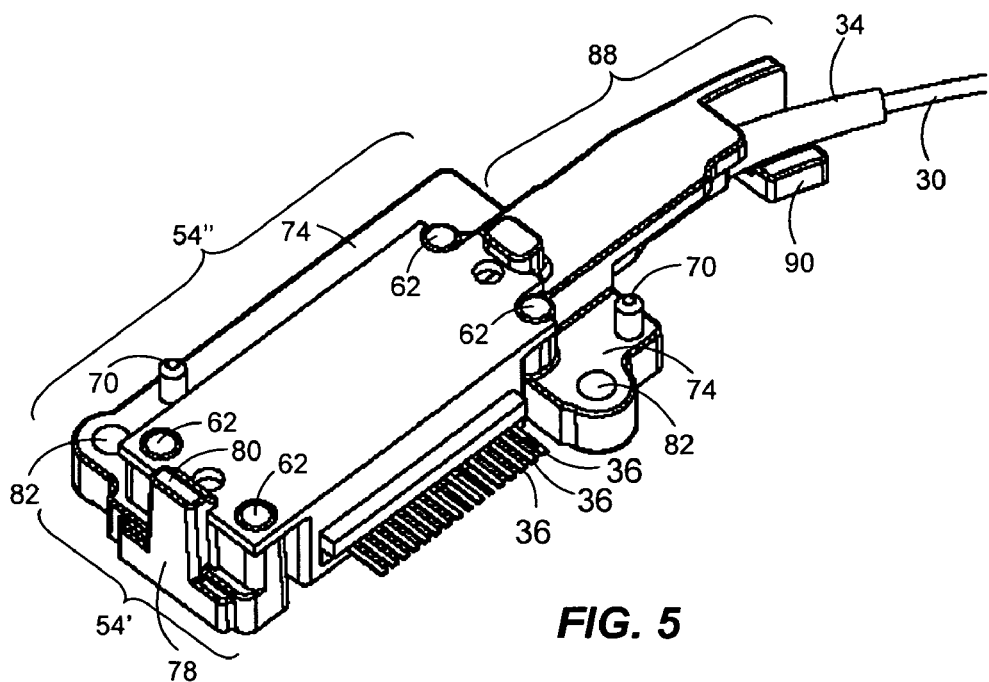
FIG. 5 is an illustration of a laser module attached to the carrier of FIG. 3A and FIG. 3B.

Alignment and attachment of the laser module 10 to the PCB 42 occurs in a straightforward manner. Referring to FIG. 1, FIG. 3A and FIG. 3B, the optical fiber 30 is inserted into the fiber guide 86 with sufficient slack to allow the laser module 10 to be easily manipulated within the carrier region 58. The laser module 10 is then inserted through the region 58 in the carrier 38 from underneath (i.e., up from underneath in FIG. 3A) until the laser module 10 is above the carrier 38. By pushing the laser module 10 downward so that the holes 22 and notches 26 engage the module alignment pins 62, the laser module 10 is accurately laterally positioned on the carrier 38. While the laser module 10 is pushed downward, the resilient stem 78 of the capture device 76 is urged away from the adjacent flange 18. When the laser module 10 is pressed into the region 58 so that it is seated against the upper surfaces 66 of the sides 54', 54'", the resilient stem 78 returns (i.e., snaps) back to its original position. As a result, the tab 80 applies pressure to the top of the laser module 10 to secure it vertically to the carrier 38. The optical fiber 30 is then fed through the elongated portion 88 of the cable guide 86 until a portion of the fiber boot 34 is adjacent the fiber clip 90. The cable boot 34 is then pressed against the fiber clip 90 which flexes outward (i.e., away from the axis of the fiber 30) before snapping back to grip the fiber boot 34. FIG. 5 illustrates the laser module 10 mounted to the carrier 38 after the attachment process is completed.

Figure 6:
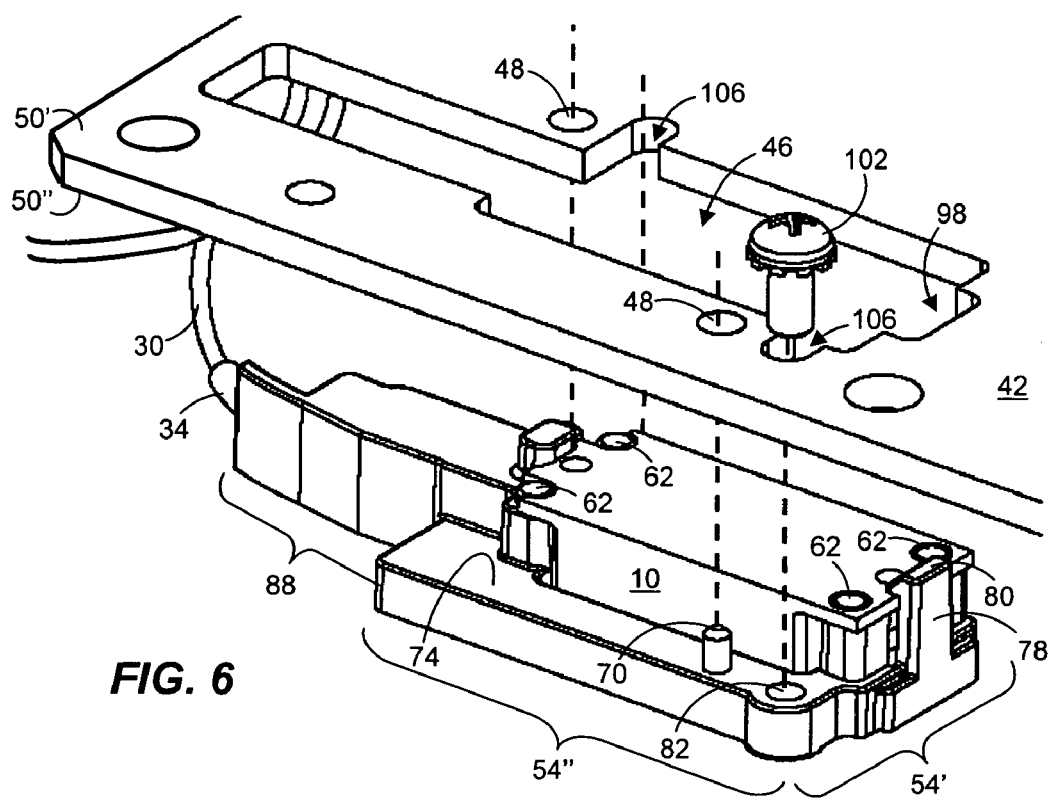
FIG. 6 shows the alignment of features on the carrier of FIGS. 3A and 3B to a printed circuit board prior to attachment.
Figure 7:
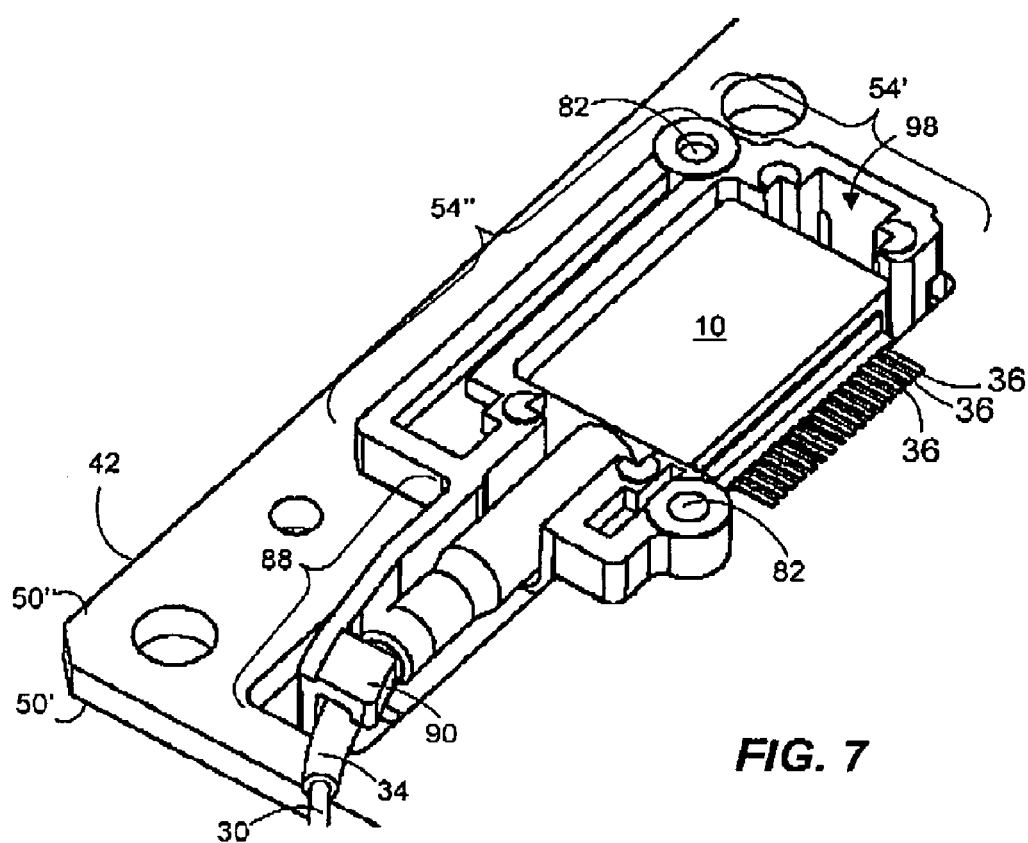
FIG. 7 is an illustration of a bottom view of the carrier of FIGS. 3A and 3B after attachment to a printed circuit board.

FIG. 6 shows a top view of the alignment of features on the carrier 38 to the PCB 42. FIG. 7 illustrates a bottom view of the carrier 38 mounted to the PCB 42. Referring to FIG. 6 and FIG. 7, attaching the carrier 38 to the PCB 42 includes moving the laser module 10 upward (in FIG. 6) so that the laser module 10 extends into the opening 46 in the PCB 42. A notch 98 at one end of the PCB opening 46 provides clearance for the stem 78 of the capture device. The board alignment pins 70 engage the alignment holes 48 when the carrier 38 is properly laterally positioned with respect to the PCB 42. Screws 102 (only one shown) are inserted through respective notches 106 along the edge of the PCB opening 46. The screws 102 extend through the holes 82 in the frame 52. The screws form threads in the holes 82 when they are first inserted. The screws 102 loosely hold the carrier 38 in place during alignment to the PCB 42 and while the leads 36 are soldered to the PCB contacts. The screws 102 are then tightened to secure the carrier 38 in place. During this process, the lower surfaces 74 of the sides 54", 54'" are maintained in contact with the lower surface 50" of the PCB 42.

A heat sink for removal of excess heat from the laser module can be mounted directly to the PCB 42. As previously described, strict dimensional tolerances result in accurate vertical positioning of the laser module 10 to the PCB 42. Thus, a surface of the heat sink can be mounted directly to the PCB 42 so that the surface of the heat sink is in close proximity with an upper surface of the laser module 10. A thermal epoxy/resin is used to ensure full contact between the heat sink and the laser module 10. Thus the laser module 10 does not have to support the weight of the heat sink and no significant stress is imparted to the leads 36 extending from the laser module 10.

While the invention has been shown and described with reference to specific preferred embodiments, it should be understood by those skilled in the art that various changes in form and detail may be made therein without departing from the spirit and scope of the invention as defined by the following claims. For example, although the above description primarily refers to a laser module secured in the carrier, one of ordinary skill should recognize that the carrier of the present invention can be used to align and attach any of a variety of optical or electronic modules to a circuit board.

What is claimed is:

1. A carrier for attachment of a laser module to a circuit board, the laser module having a plurality of leads extending therefrom, the carrier comprising:
   a frame having a first side, a second side and a third side in a C-shaped configuration, at least one of the sides having a first surface, at least one of the sides having a second surface, and at least one of the sides having an opening to receive a board fastener, the first and second surfaces being separated by a predetermined distance so that the leads of the laser module are positioned substantially along a surface of the circuit board when the laser module is secured to the carrier and the carrier is secured to the circuit board;
   a first plurality of alignment posts disposed on the first surfaces;
   a second plurality of alignment posts disposed on the second surfaces;
   a capture clip disposed on one of the sides to secure the laser module to the frame; and
   a fiber guide extending from one of the sides.

2. The carrier of claim 1 further comprising a fiber clip disposed on the fiber guide to secure an optical fiber extending from the laser module to the fiber guide.

3. A carrier for aliment and attachment of a laser module to a circuit board, the laser module having a plurality of leads extending therefrom, the carrier comprising:
   a frame having a plurality of sides defining a region to receive the laser module, the frame having a gap between two of the sides for passage of the leads from the laser module, at least one of the sides having a first surface configured to maintain contact with a surface of the laser module when the laser module is secured to the frame, at least one of the sides having a second surface configured to maintain contact with a surface of the circuit board when the carrier is secured to the circuit board, the first and second surfaces of the sides being separated by a predetermined distance to position all the leads substantially in contact with the surface of the circuit board;
   a first alignment guide disposed on the frame to align the laser module to the carrier; and
   a fiber guide extending from one of the sides opposite the region to receive the laser module.

4. The carrier of claim 3 further comprising a fiber clip disposed on the fiber guide to secure an optical fiber extending from the laser module to the fiber guide.

5. A carrier for alignment and attachment of an electronics module to a circuit board, the electronics module having a plurality of leads extending therefrom, the carrier comprising:
   a frame having a plurality of sides defining a region to receive the electronics module, the frame having a gap between two of the sides for passage of the leads from the electronics module, at least one of the sides having a first surface configured to maintain contact with a surface of the electronics module when the electronics module is secured to the frame, at least one of the sides having a second surface configured to maintain contact with a surface of the circuit board when the carrier is secured to the circuit board, the first and second surfaces of the sides being separated by a predetermined distance to position all the leads substantially in contact with the surface of the circuit board;
   a first alignment guide disposed on the frame to align the electronics module to the carrier; and
   a wire guide extending from one of the sides opposite the region to receive the electronics module.

6. The carrier of claim 5 further comprising a wire clip disposed on the wire guide for attaching at least one wire extending from the electronics module to the wire guide.

* * * * *